(12) United States Patent
Fukano

(10) Patent No.: US 7,066,202 B2
(45) Date of Patent: Jun. 27, 2006

(54) INDICATOR-EQUIPPED FLOW REGULATING VALVE

(75) Inventor: Yoshihiro Fukano, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 163 days.

(21) Appl. No.: 10/420,784

(22) Filed: Apr. 23, 2003

(65) Prior Publication Data

US 2003/0201015 A1 Oct. 30, 2003

(30) Foreign Application Priority Data

Apr. 30, 2002 (JP) .................................... 2002-129136

(51) Int. Cl.
*F16K 37/00* (2006.01)

(52) U.S. Cl. ........................ 137/557; 137/553; 137/559; 251/14; 251/63.5

(58) Field of Classification Search .................. 137/553, 137/557, 559; 251/14, 63.5, 331
See application file for complete search history.

(56) References Cited

U.S. PATENT DOCUMENTS

| 3,451,423 | A | * | 6/1969 | Priese | 251/63.5 |
| 6,138,712 | A | * | 10/2000 | Hirose | 137/559 |
| 6,481,459 | B1 | | 11/2002 | Fukano et al. | |
| 6,805,158 | B1 | * | 10/2004 | Ejiri | 137/557 |

* cited by examiner

*Primary Examiner*—John Rivell
(74) *Attorney, Agent, or Firm*—Paul A. Guss

(57) ABSTRACT

An indicator-equipped flow regulating valve includes a valve body through which a fluid flows, a connecting body connected to an upper portion of the valve body, a housing connected to an upper portion of the connecting body, a piston arranged in the connecting body and the housing and displaceable when pressed by the pilot air, a shaft connected to the piston, a diaphragm connected to a lower end of the shaft and seated on a valve seat formed in the valve body, a flow regulating section regulating the flow rate of the fluid flowing through the valve body, and an indicator section indicating an opened/closed state of the diaphragm.

11 Claims, 5 Drawing Sheets

INDICATOR-EQUIPPED FLOW REGULATING VALVE

BACKGROUND OF THE INVENTION

1. Field of the Invention

The present invention relates to an indicator-equipped flow regulating valve which controls the flow rate of a fluid by regulating, for example, the valve opening degree of a valve plug displaced by the pilot air and which makes it possible to visually recognize the opened/closed state of the valve plug.

2. Description of the Related Art

A flow regulating valve has been hitherto adopted to adjust or regulate the opening degree of a valve which is displaceable by the pilot air and to control the flow rate of the fluid flowing through a fluid passage. For example, the flow regulating valve is connected to a fluid pipe through which the fluid flows. In order to confirm the opened/closed state of the valve of the flow regulating valve, a two way valve equipped with an indicator is connected independently to the pipe disposed on the downstream side of the flow regulating valve. The indicator is displaceable in response to the flow rate of the fluid flowing through the pipe.

That is, when the flow regulating valve is in the valve-opened state, then the fluid flowing through the flow regulating valve is supplied to the two way valve connected on the downstream side, and the indicator of the two way valve is displaced by the fluid. Accordingly, the indicator shows that the flow regulating valve is ON, i.e., in the valve-opened state. When the flow regulating valve is in the valve-closed state, the fluid is not supplied to the two way valve connected on the downstream side, because the fluid is blocked in the flow regulating valve. Therefore, the indicator of the two way valve is displaced in a direction opposite to that in the valve-opened state, and the indicator shows that the flow regulating valve is OFF, i.e., in the valve-closed state.

However, the flow regulating valve and the indicator-equipped two way valve are provided independently on the pipe. Therefore, the piping cost for connecting them is increased, and the piping operation is complicated.

SUMMARY OF THE INVENTION

A general object of the present invention is to provide an indicator-equipped flow regulating valve in which an indicator and a flow regulating valve are constructed integrally and which makes it possible to reliably indicate the opened/closed state of a valve plug by the indicator.

A principal object of the present invention is to provide an indicator-equipped flow regulating valve which makes it possible to regulate or restrict the displacement of a valve plug by a fastening mechanism.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
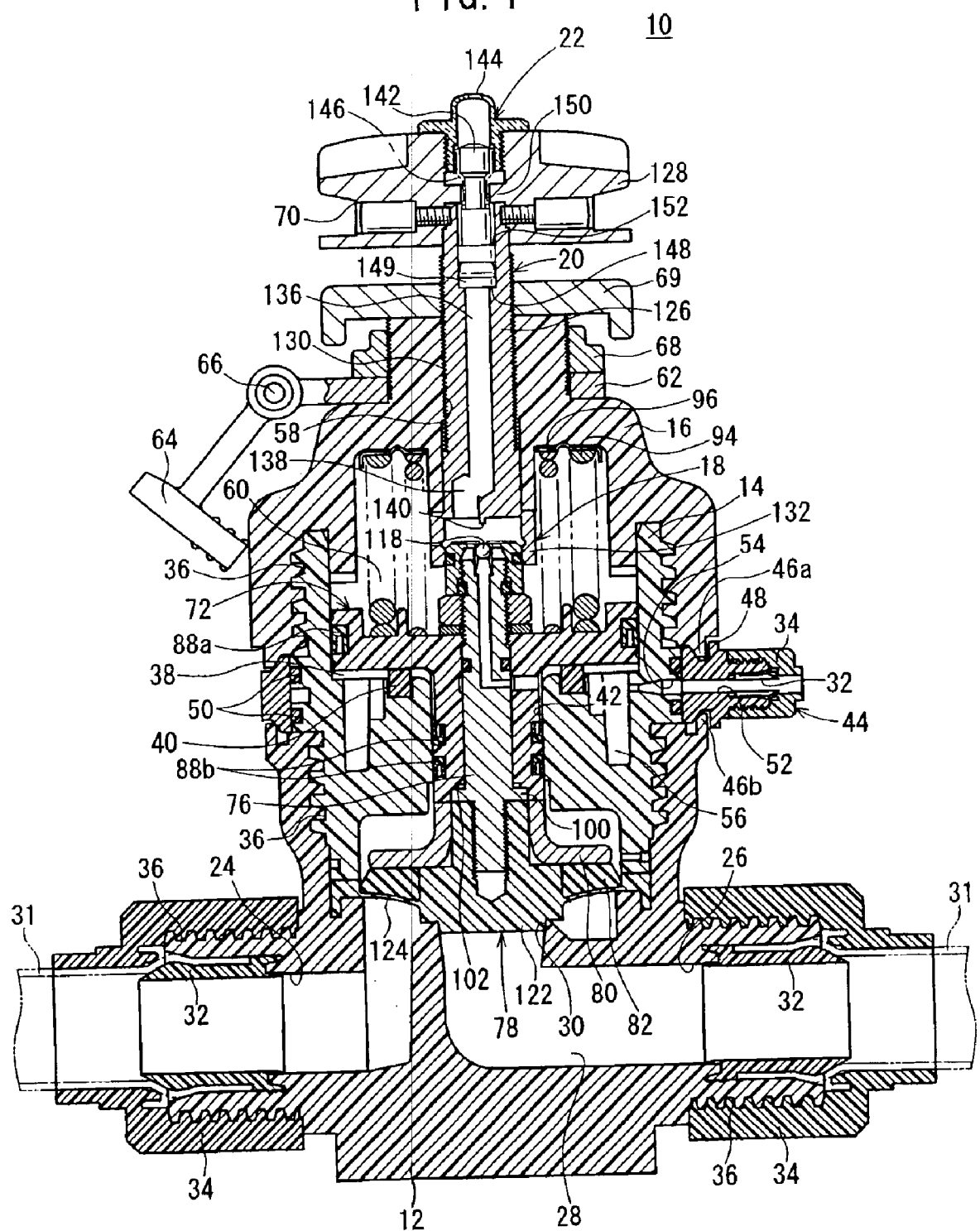
FIG. 1 is a vertical sectional view illustrating the valve-closed state of an indicator-equipped flow regulating valve.
Figure 2:
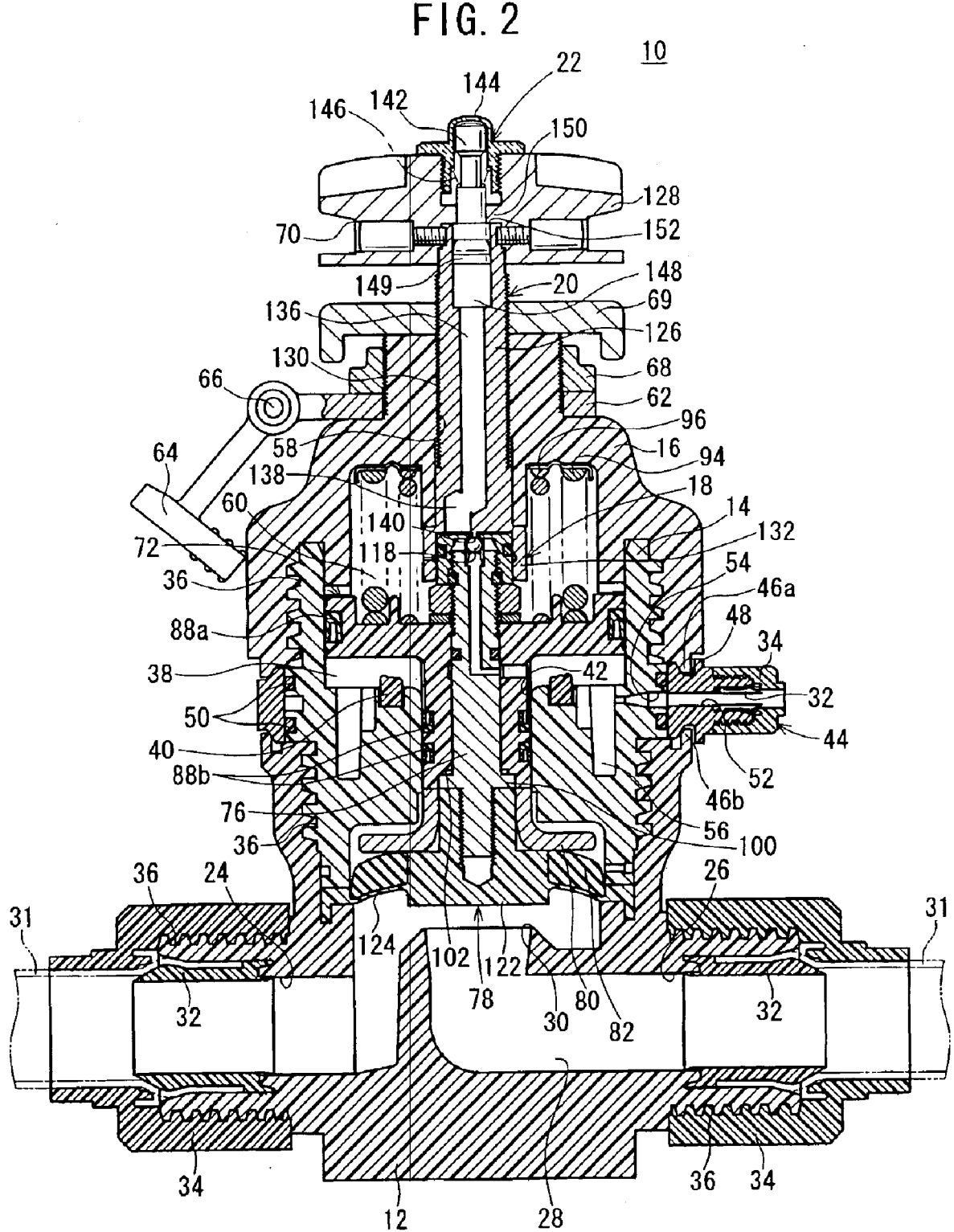
FIG. 2 is the valve-opened state of the indicator-equipped flow regulating valve shown in FIG. 1.

With reference to FIGS. 1 and 2, reference numeral 10 indicates an indicator-equipped flow regulating valve according to an embodiment of the present invention.

The indicator-equipped flow regulating valve 10 comprises a valve body 12 through which the fluid flows, a connecting body 14 connected to an upper portion of the valve body 12, a housing 16 connected to an upper portion of the connecting body 14, a valve mechanism section 18 arranged in the connecting body 14 and the housing 16, a flow section 20 which adjusts or regulates the flow rate of the fluid flowing through the valve body 12, and an indicator section (indicating section) 22 which indicates the displacement of the valve mechanism section 18.

The valve body 12 has a first port 24 formed at one end, and a second port 26 formed at the other end. A communication passage 28 communicates with the first port 24 and the second port 26. A valve seat 30 is formed in the communication passage 28, on which a diaphragm 78 is seated as described later on. An inner member 32 is arranged in each of the first port 24 and the second port 26, and is inserted into an opening of a tube 31. A lock nut 34 is screwed into a screw groove 36 engraved on the outer circumferential portion of each of the first port 24 and the second port 26. Therefore, the tube 31 is connected airtightly to each of the first port 24 and the second port 26 when the lock nut 34 is screwed.

An outer circumferential portion of the connecting body 14 is screwed with a screw groove 36 engraved on an inner and upper circumferential portion of the valve body 12. The valve body 12 and the connecting body 14 are connected to one another.

A first cylinder chamber 38 is formed in the connecting body 14, in which a piston 72 is arranged displaceably in the axial direction as described later on.

A buffer member 40 is installed to an annular groove on the lower surface of the first cylinder chamber 38. That is, the buffer member 40 can absorb the shock generated when the piston 72 is displaced downwardly by the spring forces of first and second spring members 94, 96 as described later and the lower surface of the piston 72 abuts against the lower surface of the first cylinder chamber 38. An insertion hole 42 having a diameter smaller than that of the first cylinder chamber 38 is formed under the first cylinder chamber 38 to communicate with the first cylinder chamber 38 and the communication passage 28 of the valve body 12.

A connecting plug 44 is installed to the side surface of the connecting body 14, to which the pilot air is supplied via a tube 31.

An inner member 32 is arranged in the connecting plug 44, and is inserted into an opening of the tube 31. A lock nut 34 is screwed with a screw groove 36 formed on an outer circumferential portion of the connecting plug 44. Projections 46a, 46b protrude toward the connecting plug 44 from the side surfaces of the valve body 12 and the housing 16, respectively. When a recess 48 of the connecting plug 44 is engaged with the projections 46a, 46b, the connecting plug 44 is movable along the side surface of the connecting body 14, i.e., along the circumference of the connecting body 14. A seal member 50 is installed to the side surface of the connecting body 14 to which the connecting plug 44 is installed. Therefore, the pilot air supplied via the connecting plug 44 does not leak to the outside.

A passage 52 of the connecting plug 44 communicates with the first cylinder chamber 38 via a third port 54 formed through the side surface of the connecting body 14 and a communication chamber 56 formed in the connecting body 14.

A screw groove 36 is engraved on an outer and upper circumferential portion of the connecting body 14. An inner circumferential portion of the housing 16 is screwed with the screw groove 36 to connect the connecting body 14 and the housing 16.

A screw hole 58 penetrates through a substantially central portion of the housing 16. A flow regulating shaft 126 is screw-engaged therewith displaceably in the axial direction as described later on.

A space section 60 is formed in the housing 16 near the connecting body 14.

A substantially annular supporting member 62 is screwed on the housing 16. A stopper (fastening member) 64 is rotatably supported about the support point of a screw member 66 at a radially outwardly protruding portion of the supporting member 62. A tightening nut 68 is screwed on the supporting member 62 so that the supporting member 62 is interposed between the tightening nut 68 and the housing 16. A rotation-preventive nut 69 is screwed on the tightening nut 68, which locks the rotation of a flow regulating handle 128 after regulating the flow rate by the flow regulating handle 128 as described later on.

The stopper 64 has a substantially T-shaped configuration. One end of the stopper 64 is engaged with an engaging recess 70 formed on the side surface of the flow regulating handle 128 when the stopper 64 is rotated about the support point of the screw member 66.

That is, the flow regulating shaft 126 is prevented from upward displacement when the stopper 64 is engaged with the flow regulating shaft 126. In this state, the shaft 76 is pressed by the flow regulating shaft 126. Accordingly, the diaphragm (valve plug) 78 is prevented from separation from the valve seat 30 in a locked state.

The valve mechanism section 18 comprises the piston 72 provided displaceably in the axial direction in the first cylinder chamber 38, the shaft 76 inserted into the substantially central portion of the piston 72 and connected to the piston 72 by a nut 74, the diaphragm 78 connected to the lower end of the shaft 76, a displaceable member 80 connected to the lower end of the piston 72 and displaceable together with the piston 72, and an elastic member 82 interposed between the displaceable member 80 and the diaphragm 78 and formed of an elastic material such as rubber to protect the diaphragm 78 thereby.

Figure 3:
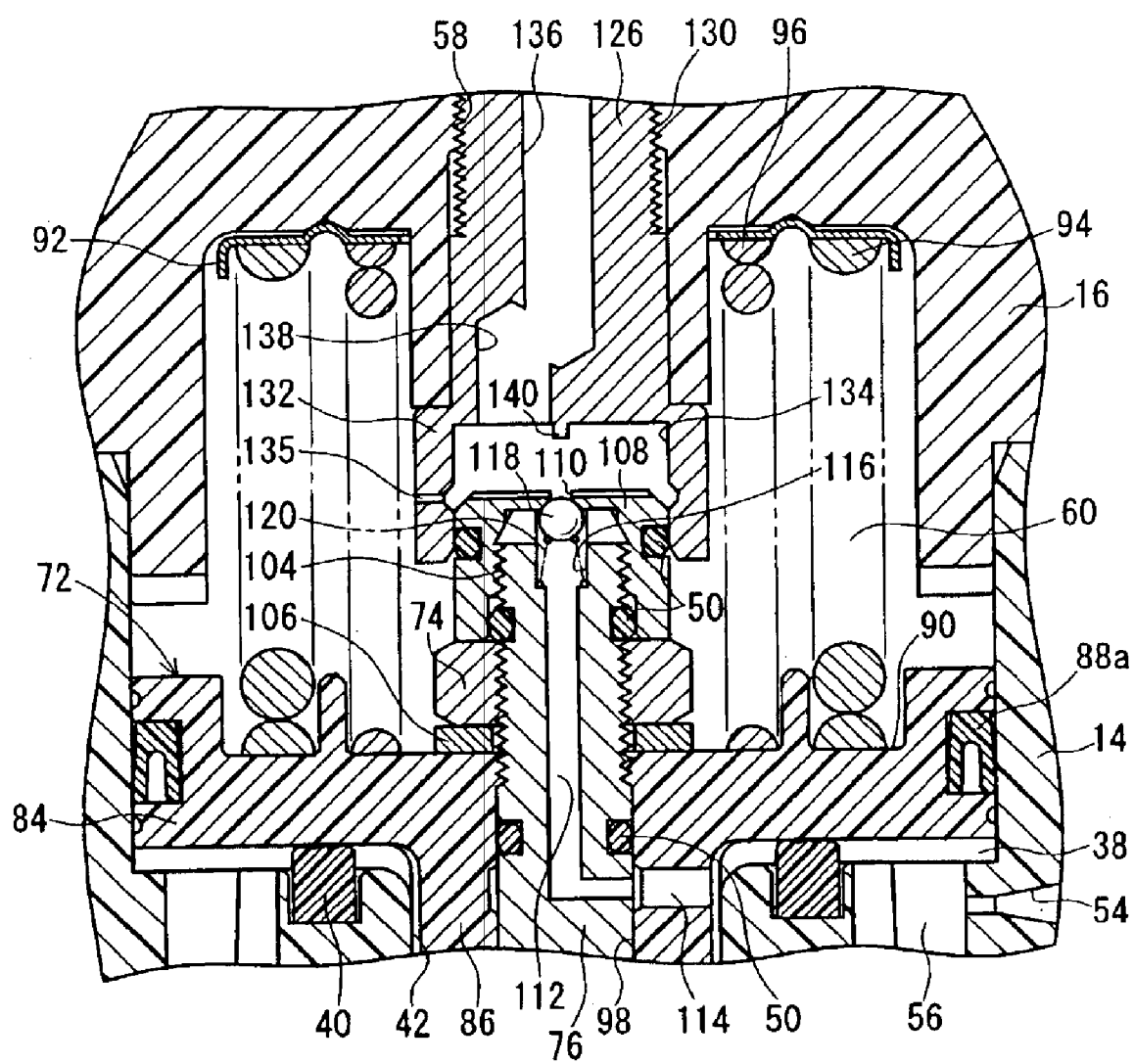
FIG. 3 is, with partial omission, a magnified vertical sectional view illustrating the indicator-equipped flow regulating valve.
Figure 4:
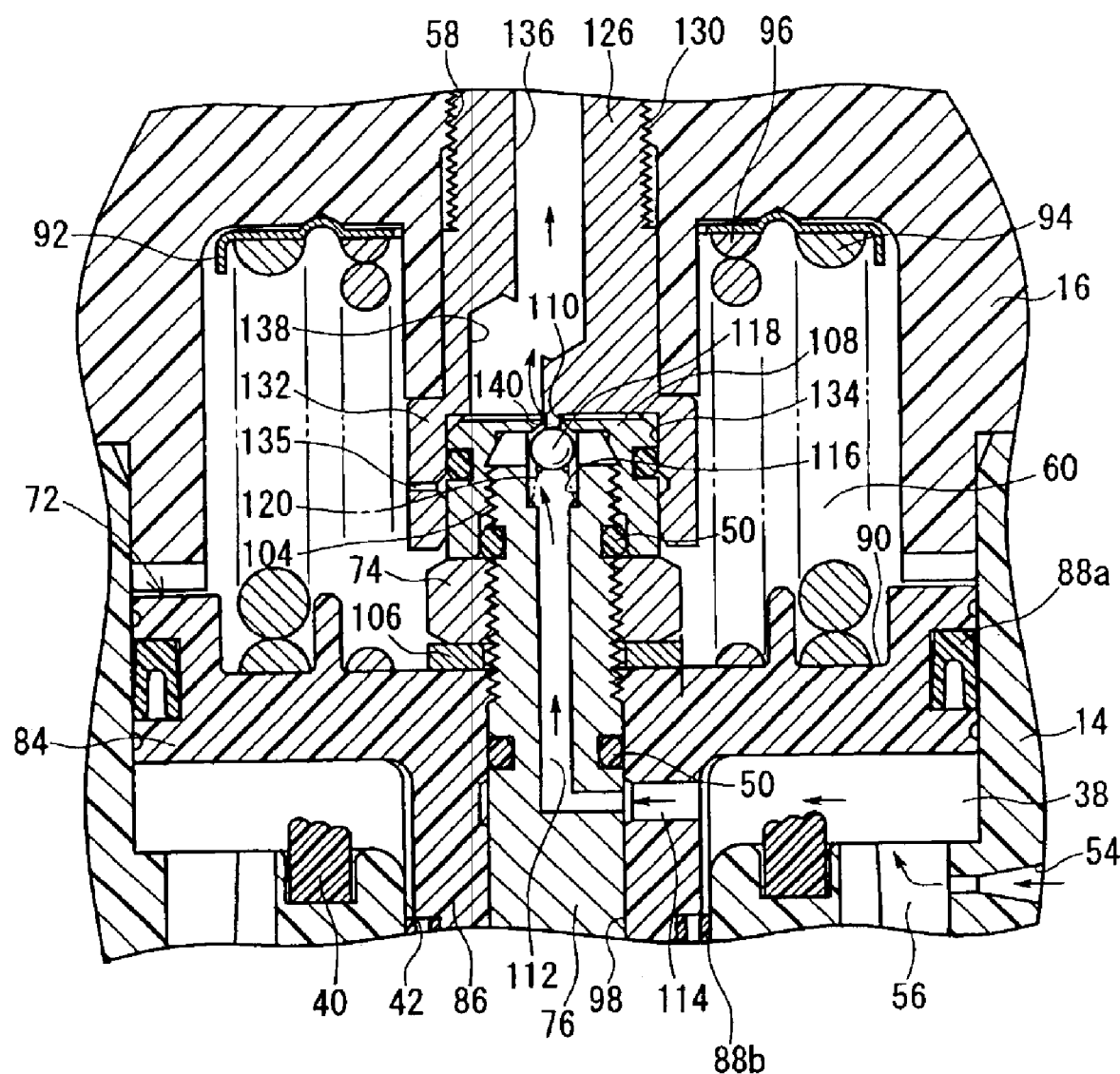
FIG. 4 is, with partial omission, a magnified vertical sectional view in which a steel ball shown in FIG. 3 is pressed downwardly by a projection.

The piston 72 has a substantially T-shaped cross section. As shown in FIGS. 3 and 4, a large diameter section 84 formed on one end of the piston 72 is inserted into the first cylinder chamber 38. A small diameter section 86, which has a diameter smaller than that of the large diameter section 84, is formed on the other end of the piston 72. The small diameter section 86 is inserted into the insertion hole 42. A piston packing 88a is installed to an annular groove on the outer circumferential surface of the large diameter section 84, and abuts against the inner circumferential surface of the first cylinder chamber 38 to retain the air-tightness in the first cylinder chamber 38 thereby.

A piston packing 88b is also installed to an annular groove on the outer circumferential surface of the small diameter section 86 in the same manner as described above. As shown in FIGS. 1 and 2, the piston packing 88b abuts against the inner circumferential surface of the insertion hole 42 (see FIGS. 3 and 4) to retain the air-tightness in the first cylinder chamber 38 and the communication passage 28 of the valve body 12.

An annular recess 90 (see FIGS. 3 and 4) is formed on the upper surface of the piston 72. A spring-receiving member 92 is installed on the upper surface of the space section 60 of the housing 16. A first spring member 94 is interposed between the annular recess 90 and the spring-receiving member 92. One end of the first spring member 94 is engaged with the annular recess 90. Therefore, the first spring member 94 is prevented from disengagement in the radial direction.

A second spring member 96 is interposed between the piston 72 and the spring-receiving member 92, radially inwardly with respect to the first spring member 94. The first and second spring members 94, 96 are urged in the direction to press the piston 72 downwardly.

On the other hand, a through-hole 98 is formed at a substantially central portion of the piston 72, and the shaft 76 is inserted thereinto. A flange section 100 (see FIGS. 1 and 2) is formed at a lower portion of the shaft 76, and is expanded radially outwardly. The flange section 100 is engaged with an engaging groove 102 (see FIGS. 1 and 2) formed on the lower surface of the piston 72. A nut 74 is screwed via a washer 106 with a screw section 104 formed at an upper portion of the shaft 76, and thus the piston 72 and the shaft 76 are connected to one another. The air-tightness is retained in the first cylinder chamber 38 by the a seal member 50 installed to the outer circumferential surface of the shaft 76.

A substantially C-shaped holding member 108 is screwed on the nut 74 at the upper end of the shaft 76. A hole 110 is formed through a substantially central portion of the holding member 108.

As shown in FIG. 3, a first pilot passage 112 is formed at an upper portion of the shaft 76, and extends by a predetermined length along the axis. The first pilot passage 112 is bent at the lower end disposed along the axis in a direction substantially perpendicular to the axis. The first pilot passage 112 communicates with the interior of the first cylinder chamber 38 via a communication hole 114 formed through the small diameter section 86 of the piston 72.

The first pilot passage 112 is formed penetratingly up to the upper surface of the shaft 76 in the axial direction. An installation hole 116 is expanded radially outwardly by a predetermined length in the axial direction from the upper surface of the shaft 76. A steel ball 118 having substantially the same diameter as the inner circumferential diameter of the installation hole 116 is installed to the installation hole 116. A spring 120 is interposed between the installation hole 116 and the lower surface of the steel ball 118. The spring force of the spring 120 urges the steel ball 118 in the direction toward the holding member 108 which is screwed with the upper end of the shaft 76. Therefore, the upper portion of the steel ball 118 is inserted into the hole 110 of the holding member 108 by the spring force of the spring 120.

As shown in FIGS. 1 and 2, the diaphragm 78 comprises a projection 122 and a skirt 124. The projection 122 screwed with the lower end of the shaft 76 and has a substantially central portion protruding downwardly to be seated on the valve seat 30. The skirt 124 extends radially outwardly from the side surface of the projection 122. An outer edge of the skirt 124 is interposed between the valve body 12 and the connecting body 14.

The projection 122 of the diaphragm 78 is seated on or separated from the valve seat 30 formed on the valve body 12 to open/close the communication passage 28 between the first port 24 and the second port 26.

The elastic member 82 is formed of the elastic material such as rubber, and is arranged on the upper surface of the skirt 124 of the diaphragm 78. Accordingly, it is possible to protect the thin skirt 124.

The flow regulating section 20 comprises the flow regulating shaft 126 and the flow regulating handle 128. The flow regulating shaft 126 is screwed displaceably in the axial direction with the screw hole 58 formed at the substantially central portion of the housing 16. The flow regulating handle 128 is substantially cross-shaped and is connected to the upper end of the flow regulating shaft 126.

The flow regulating shaft 126 has a screw section 130 engraved on the outer circumferential surface of the flow regulating shaft 126. The screw section 130 is screwed with the screw hole 58 penetrating through the substantially central portion of the housing 16. In this arrangement, when the flow regulating handle 128 connected to the upper portion of the flow regulating shaft 126 is rotated, the flow regulating shaft 126 is screwed and rotated along the screw hole 58, and thus the flow regulating shaft 126 can be displaced in the axial direction.

In this arrangement, the position of the flow regulating shaft 126 in the axial direction can be arbitrarily determined by screwing and rotating the flow regulating handle 128, and it is possible to change the position of the upper surface of an insertion hole 134 against which the upper end of the shaft 76 abuts (as described later on). Accordingly, it is possible to arbitrarily adjust the displacement amounts of the piston 72 and the diaphragm 78, i.e., the valve-opening degree by the shaft 76.

As shown in FIGS. 3 and 4, a substantially C-shaped engaging section 132 is formed at the lower end of the flow regulating shaft 126. The engaging section 132 has a diameter larger than the shaft diameter of the flow regulating shaft 126. The holding member 108 is inserted into an insertion hole 134 formed in the engaging section 132. The holding member 108 is screwed with the upper end of the shaft 76. A fluid port 135 is formed through the side surface of the engaging section 132, and communicates the insertion hole 134 and the outside.

The insertion hole 134 has an inner circumferential diameter which is substantially the same as the outer circumferential diameter of the holding member 108. The air-tightness is appropriately retained in the insertion hole 134 by a seal member 50 installed to the outer circumferential surface of the holding member 108.

A second pilot passage 136 is formed along the axis in the flow regulating shaft 126. The second pilot passage 136 communicates with a communication hole 138 formed at the lower end of the flow regulating shaft 126 eccentrically with respect to the second pilot passage 136. The second pilot passage 136 communicates with the interior of the insertion hole 134 via the communication hole 138.

A projection 140 protruding downwardly by a predetermined length is formed on the upper surface of the insertion hole 134 of the flow regulating shaft 126. The projection 140 is formed at a position facing the steel ball 118 and the hole 110 of the holding member 108 screwed with the shaft 76. A diameter of the projection 140 is slightly smaller than the diameter of the hole 110.

As shown in FIGS. 1 and 2, the indicator section 22 comprises an indicator 142, a cover member 144, a return spring (spring member) 146, and a second cylinder chamber 148. The indicator 142 is arranged at an upper portion of the flow regulating shaft 126 and is provided displaceably in the axial direction. The cover member 144 is screwed with a substantially central portion of the flow regulating handle 128. The return spring 146 is interposed between the indicator 142 and the cover member 144, and urges the indicator 142 downwardly. The second cylinder chamber 148 communicates with the second pilot passage 136 of the flow regulating shaft 126, and the pilot air is supplied to the second cylinder chamber 148.

The indicator 142 has a piston section 149 formed at a lower portion thereof. The pilot air supplied to the second cylinder chamber 148 via the second pilot passage 136 of the flow regulating shaft 126 presses the piston section 149 to be displaced in the axial direction in the cover member 144. In this situation, a step section 152 on the outer circumferential surface of the indicator 142 is fastened by a fastening section 150 protruding radially inwardly by a predetermined length from the inner circumferential surface of the flow regulating handle 128. Accordingly, the upward displacement of the indicator 142 is restricted. That is, when the indicator 142 is displaced upwardly, the indicator 142 does not contact the cover member 144.

An unillustrated packing is installed to an annular groove on the outer circumferential surface of the indicator 142 to retain the air-tightness of the second cylinder chamber 148.

The cover member 144 is formed of a transparent or semitransparent material so that the displacement of the indicator 142 in the axial direction is visually recognizable. In order to visually recognize the indicator 142 from the outside with ease, for example, the indicator 142 may be colored with a color including, for example, red and orange.

The indicator-equipped flow regulating valve according to the embodiment of the present invention is basically constructed as described above. Next, its operation, function, and effect will be explained.

FIG. 1 shows that no pilot air is supplied to the interior of the first cylinder chamber 38, i.e., the diaphragm 78 is seated on the valve seat 30 by the spring forces of the first and second spring members 94, 96 to block the communication between the first port 24 and the second port 26 in the valve-closed state.

Starting from the state as described above, the pilot air (for example, compressed air) is supplied into the first cylinder chamber 38 via the tube 31 connected to the connecting plug 44.

In this situation, the pilot air supplied to the first cylinder chamber 38 is introduced into the first pilot passage 112 of the shaft 76 via the communication hole 114 of the piston 72. However, as shown in FIG. 3, the hole 110 of the holding member 108 communicating with the first pilot passage 112 is closed by the steel ball 118 which is pressed by the spring force of the spring 120. Therefore, the pilot air is not supplied into the insertion hole 134 via the hole 110.

As shown in FIG. 2, the piston 72 is displaced upwardly against the spring forces of the first and second spring members 94, 96 by the pressure of the pilot air supplied to the first cylinder chamber 38. During this process, the shaft 76 connected to the substantially central portion of the piston 72 is also displaced upwardly. Further, the projection 122 of the diaphragm 78 connected to the lower end of the shaft 76 is separated from the valve seat 30, and then the first port 24 communicates with the second port 26 via the communication passage 28.

In this situation, as shown in FIG. 4, the shaft 76 is displaced upwardly when the piston 72 is displaced, and the upper surface of the holding member 108 abuts against the lower surface of the insertion hole 134. When the holding member 108 is displaced upwardly together with the shaft 76, the fluid previously remaining in the insertion hole 134 is discharged outside through the fluid port 135.

That is, when the holding member 108 is displaced upwardly together with the shaft 76, the fluid previously remaining in the insertion hole 134 and the second pilot passage 136 is supplied into the second cylinder chamber 148 by the pressing action of the holding member 108. Accordingly, it is possible to prevent the indicator 142 from upward displacement which would be otherwise caused by the pressing action of the fluid.

The projection 140 of the flow regulating shaft 126 abuts against the upper surface of the steel ball 118, and the steel ball 118 is pressed downwardly against the spring force of the spring 120. As a result, the projection 140 is inserted into the hole 110, and the steel ball 118 is separated from the hole 110. Accordingly, the pilot air supplied to the first pilot passage 112 of the shaft 76 is introduced into the insertion hole 134 through the gap between the hole 110 and the projection 140.

The pilot air supplied into the insertion hole 134 from the first pilot passage 112 of the shaft 76 is supplied to the second cylinder chamber 148 via the communication hole 138 of the flow regulating shaft 126 and the second pilot passage 136. The indicator 142 is displaced upwardly against the spring force of the return spring 146 by the pilot air supplied to the second cylinder chamber 148. When the diaphragm 78 is separated from the valve seat 30 to be the valve-opened state, the indicator 142 is reliably displaced upwardly in the cover member 144. It is possible to visually recognize from the outside with ease the fact that the diaphragm 78 is in the valve-opened state (the indication of ON) (see FIG. 2).

As for the piston 72, the shaft 76 is displaced upwardly under the pressing action by the pilot air, the upper surface of the holding member 108 provided at the upper end of the shaft 76 abuts against the upper surface of the insertion hole 134, and thus the displacement amount of the shaft 76 is regulated or restricted in the axial direction. That is, the position of the flow regulating shaft 126 in the axial direction can be arbitrarily determined by screwing and rotating the flow regulating handle 128 to change the position of the upper surface of the insertion hole 134 against which the upper end of the shaft 76 abuts. Accordingly, it is possible to arbitrarily adjust the displacement amount of the diaphragm 78, i.e., the valve opening degree by the shaft 76.

Next, an explanation will be made about a procedure performed reversely to the above to obtain the valve-closed state (see FIG. 1) in which the diaphragm 78 is seated on the valve seat 30 to block the communication between the first port 24 and the second port 26. The explanation is started from the valve-opened state (see FIG. 2) in which the diaphragm 78 is separated from the valve seat 30 for the first port 24 to communicate with the second port 26.

In this procedure, the supply of the pilot air from the tube 31 connected to the connecting plug 44 is stopped, and the tube 31 is opened to the atmospheric air.

Since the interior of the first cylinder chamber 38 is opened to the atmospheric air, the piston 72, which has been displaced upwardly by the pressure of the pilot air, is displaced downwardly by the spring forces of the first and second spring members 94, 96. During this process, the shock exerted when the piston 72 abuts against the lower surface of the first cylinder chamber 38 is absorbed by the buffer member 40 provided on the lower surface of the first cylinder chamber 38.

When the piston 72 is displaced downwardly, the diaphragm 78 connected to the piston 72 by the shaft 76 is seated on the valve seat 30 to be the valve-closed state in which the communication between the first port 24 and the second port 26 is blocked.

In this process, as shown in FIG. 3, when the shaft 76 is displaced downwardly together with the displacement of the piston 72, the steel ball 118 pressed by the projection 140 of the flow regulating shaft 126 is separated from the projection 140. Accordingly, the upper portion of the steel ball 118 presses the hole 110 by the spring force of the spring 120, and the hole 110 is in the closed state.

Accordingly, as shown in FIG. 1, the supply of the pilot air to the second cylinder chamber 148 is blocked, and the indicator 142 is displaced downwardly by the spring force of the return spring 146. As a result, the indicator 142 is displaced downwardly in the cover member 144, and it is possible to visually recognize easily the fact that the diaphragm 78 is seated on the valve seat 30 in the valve-closed state (the indication of OFF).

That is, the steel ball 118 is separated from the hole 110 under the pressing action of the projection 140 and the steel ball 118 is seated on the hole 110 by the spring force of the spring 120 to switch the communication state and the non-communication state of the pilot air supplied to the first pilot passage 112 as a check valve.

Figure 5:
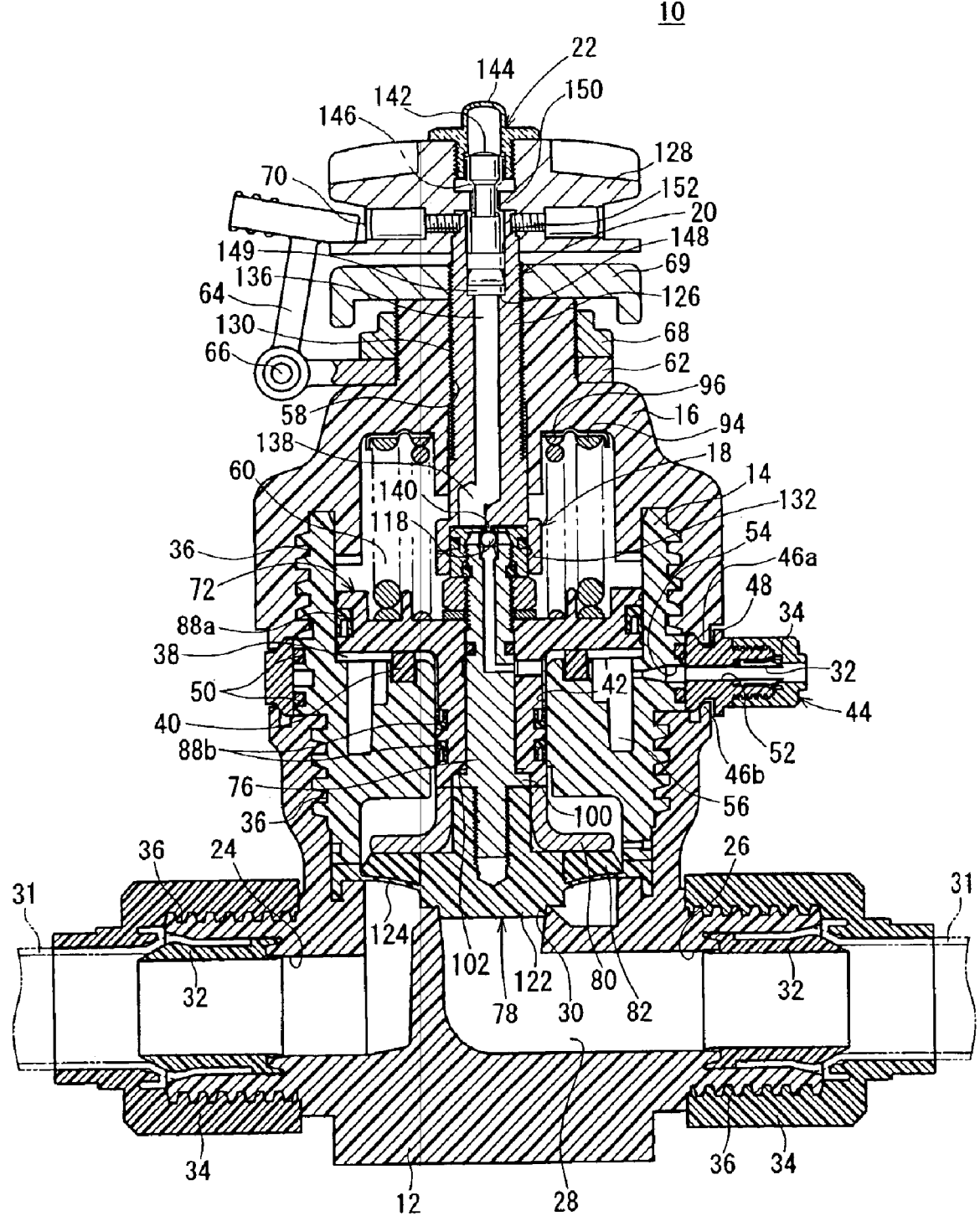
FIG. 5 is a vertical sectional view illustrating a locked state of the indicator-equipped flow regulating valve shown in FIG. 1.

Further, as shown in FIG. 5, the shaft 76 is displaced downwardly to be the valve-closed state in which the diaphragm 78 is seated on the valve seat 30. The flow regulating handle 128 is screwed and rotated to displace the flow regulating shaft 126 downwardly until the upper surface of the insertion hole 134 of the flow regulating shaft 126 abuts against the upper surface of the holding member 108 screwed with the shaft 76. That is, the flow regulating shaft 126 is used to prevent the diaphragm 78 from separation from the valve seat 30 by the shaft 76.

While the engaging section 132 of the flow regulating shaft 126 abuts against the upper end of the shaft 76, the stopper 64 provided on the housing 16 by the supporting member 62 is rotated upwardly about the support point of the screw member 66 to engage one end of the stopper 64 with the engaging recess 70 of the flow regulating handle 128. As a result, the flow regulating handle 128 connected to the flow regulating shaft 126 is prevented from any displacement in the axial direction. Therefore, the stopper 64 can be used to lock the diaphragm 78 seated on the valve seat 30. Accordingly, it is possible to avoid any accidental separation of the diaphragm 78 from the valve seat 30 and the leak of the fluid, for example, when the indicator-equipped flow regulating valve 10 is maintained.

When the diaphragm 78 is released from the locked state, the stopper 64 can be separated from the engaging recess 70 such that one end of the stopper 64 engaged with the engaging recess 70 is rotated downwardly about the support point of the screw member 66. Accordingly, the diaphragm 78 is released from the restricted position (see FIG. 2).

As described above, in the embodiment of the present invention, when the diaphragm 78 is separated from the valve seat 30, the pilot air is supplied to the second cylinder chamber 148 to be the ON state in which the indicator 142 is displaced upwardly. Therefore, the valve-opened state of the diaphragm 78 is reliably coincident with the displacement position of the indicator 142 (the indication of ON). When the supply of the pilot air is stopped, the diaphragm 78 is seated on the valve seat 30 by the spring forces of the first and second spring members 94, 96 and the indicator 142 is displaced downwardly by the spring force of the return spring 146 as well (in the OFF state). Therefore, the valve-closed state of the diaphragm 78 is also reliably coincident with the displacement position of the indicator 142 (the indication of OFF).

Accordingly, the displacement position of the indicator 142 (the ON/OFF indication) can always be in accordance with the opened/closed state of the diaphragm 78. Therefore, it is possible to visually recognize the opened/closed state of the diaphragm 78 reliably by the indicator 142.

When the flow regulating valve 10 is integrally provided with the indicator 142 with which the opened/closed state of the diaphragm 78 is visually recognizable, it is sufficient that only the flow regulating valve 10 having the function of the indicator 142 is connected to the pipe. Therefore, it is possible to improve the efficiency of piping operation. Further, it is possible to reduce the number and the amount of the pipes to be connected. Thus, it is possible to reduce the cost.

On the other hand, when the stopper 64 of the housing 16 is engaged with the flow regulating handle 128, the diaphragm 78 can be locked by the flow regulating shaft 126 in which the diaphragm 78 is seated on the valve seat 30. Therefore, it is possible to avoid any accidental separation of the diaphragm 78 from the valve seat 30 and any leak of the fluid, for example, when the indicator-equipped flow regulating valve 10 is maintained.

For example, it is assumed that a valve shaft to which a valve plug is connected is prepared, and an indicator is connected to an upper portion of the valve shaft to displace a piston by the pressure of the pilot air so that the valve plug is opened/closed by the valve shaft which is connected to the piston. Additionally, it is assumed that the opened/closed state of the valve plug is visually recognizable directly in accordance with the displacement of an indicator in an indicator-equipped flow regulating valve.

In general, in the indicator-equipped flow regulating valve, the valve opening degree of the valve plug can be arbitrarily adjusted by displacing, in the axial direction, the valve plug and the valve shaft to which the valve plug is connected by using a regulating handle. In this arrangement, when the valve shaft is displaced in the axial direction, the indicator is displaced together with the valve shaft in the axial direction. Therefore, for example, when the valve opening degree of the valve plug is small, then the stroke amounts of the valve plug and the valve shaft in the axial direction are also small, and the displacement amount of the indicator (amount of separation or amount of depression from the main valve body) is small. In this case, it is difficult to visually recognize the displacement of the indicator, because the displacement amount of the indicator is small. This is a problem since the indicator cannot perform its original function well. In other words, the indicator displaced together with the valve shaft moves by the displacement amount which is in response to the valve opening degree. Therefore, the indicator may not arrive at the displacement position at which the indicator is visually recognizable.

Otherwise, a limit switch or the like may be disposed above the indicator, and the upper surface of the indicator presses the limit switch when the indicator is displaced upwardly. Even in this case, the stroke amounts of the valve shaft and the indicator are changed when the flow rate is adjusted. Therefore, for example, the indicator may not arrive at the limit switch when the indicator is displaced upwardly depending on the distance between the indicator and the limit switch and the displacement amount of the indicator. Therefore, the switching operation of the ON/OFF state of the limit switch by using the indicator is limited to only the case in which the switching operation of the ON/OFF state can be performed even when the displacement amount of the indicator is minute.

In the indicator-equipped flow regulating valve 10 according to the embodiment of the present invention, the shaft 76 to which the diaphragm 78 is connected and the flow regulating shaft 126 to which the indicator 142 is installed are provided as separate members, and the holding member 108 disposed at the upper end of the shaft 76 is inserted into the insertion hole 134 of the flow regulating shaft 126. Therefore, the pilot air is supplied to the second cylinder chamber 148, and the indicator 142 is displaced by the pilot air.

As a result, even when the valve opening degree of the diaphragm 78 is changed by the flow regulating handle 128, the indicator 142 is displaced in the axial direction by the pilot air irrelevant to the displacement amount of the shaft 76. Therefore, the indicator 142 can be always visually recognized from the outside easily.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. An indicator-equipped flow regulating valve comprising:
a piston provided displaceably in an axial direction by pilot air supplied via a pilot port;
a shaft connected to said piston;
a valve plug connected to one end of said shaft and closing a fluid passage when seated on a valve seat;
a flow regulating section provided separately from said shaft and regulating a valve opening degree of said valve plug; and
an indicating section which is displaceable to positions for indicating valve-opened and closed states of said valve plug by said pilot air supplied via a first pilot passage communicating with said pilot port,
wherein a check valve is provided at one end of said shaft to give an opened state when pressed by a projection provided at a position facing said shaft, and said check valve is in said opened state when said valve plug is separated from said valve seat in said valve-opened state so that said indicating section is displaced to said position for indicating said valve-opened state of said valve plug by said pilot air supplied via said check valve.

2. The indicator-equipped flow regulating valve according to claim 1, wherein said indicating section includes:
an indicator which is displaceable in said axial direction by said pilot air; and
a spring member which urges said indicator in a direction toward said valve plug.

3. The indicator-equipped flow regulating valve according to claim 1, further comprising a fastening mechanism which supports said valve plug, said fastening mechanism restricting displacement of said valve plug in said axial direction.

4. The indicator-equipped flow regulating valve according to claim 3, wherein said fastening mechanism includes:
   a supporting member fixed to a housing;
   a fastening member provided rotatably with respect to said supporting member; and
   a engaging recess formed on said flow regulating section,
   wherein one end of said fastening member is engaged with said engaging recess when said fastening member is rotated.

5. The indicator-equipped flow regulating valve according to claim 1, wherein said check valve includes:
   a steel ball in an installation hole formed at said other end of said shaft; and
   a spring for pressing said steel ball toward said projection,
   and wherein said check valve has a hole on which said steel ball is seated by resilient force of said spring.

6. The indicator-equipped flow regulating valve according to claim 5, wherein said steel ball is seated on said hole by said resilient force of said spring to close said check valve in a closed state when said valve plug is seated on said valve seat in said valve-closed state, and thus said indicating section is displaced to said position for indicating said valve-closed state of said valve plug.

7. The indicator-equipped flow regulating valve according to claim 5, wherein a flow regulating shaft is arranged on said other end of said shaft so that said flow regulating shaft is coaxial with said shaft, a second pilot passage is formed in said flow regulating shaft for flowing said pilot air, and a first pilot passage is formed in said shaft for flowing said pilot air.

8. The indicator-equipped flow regulating valve according to claim 2, wherein said indicator is provided with another piston section facing said flow regulating section, said other piston section is pressed by said pilot air flowing through said first pilot passage, and said indicator is displaced in said axial direction.

9. The indicator-equipped flow regulating valve according to claim 1, wherein said flow regulating section includes:
   a flow regulating shaft provided displaceably in said axial direction when screwed; and
   a handle provided at an end of said flow regulating shaft,
   and wherein said flow regulating shaft is displaced in said axial direction by rotating said handle to change a distance between said flow regulating shaft and said shaft arranged coaxially with said flow regulating shaft.

10. The indicator-equipped flow regulating valve according to claim 7, wherein said other end of said shaft is inserted displaceably in said axial direction into an engaging section which is provided at an end of said flow regulating shaft and has an expanded diameter as compared with an outer circumferential diameter of said shaft.

11. The indicator-equipped flow regulating valve according to claim 7, wherein said check valve is provided at a position at which said other end of said shaft is engaged with an end of said flow regulating shaft.

* * * * *